Dec. 13, 1960 W. C. DILLON, SR 2,963,904
DYNAMOMETER
Filed June 14, 1957 2 Sheets-Sheet 1

INVENTOR.
WILLIAM C. DILLON, SR.
BY Elliott & Pastoriza
ATTORNEYS.

Dec. 13, 1960

W. C. DILLON, SR 2,963,904

DYNAMOMETER

Filed June 14, 1957

INVENTOR.
WILLIAM C. DILLON, SR.
BY Elliott & Pastoriza
ATTORNEYS

United States Patent Office 2,963,904
Patented Dec. 13, 1960

2,963,904

DYNAMOMETER

William C. Dillon, Sr., 17514 San Fernando Mission Blvd., Granada Hills, Calif.

Filed June 14, 1957, Ser. No. 665,746

5 Claims. (Cl. 73—141)

This invention generally relates to dynamometers and more particularly to the type of dynamometers utilized in measuring exerted forces.

In applicant's Patent Number 2,287,299, issued June 23, 1942, entitled "Dynamometer," a disclosure is made of the type of dynamometer for which the present invention constitutes an improvement. The dynamometer as disclosed in Patent Number 2,287,299 has been satisfactorily used by industry for many years. Nevertheless, certain disadvantages are now apparent in the construction, which are of particular importance in applications where accuracy is an important factor. In addition, the conventional dynamometer, as disclosed in the reference patent, resulted in a non-linear incremental movement to the indicating means or pointer employed such that each dial and pointer assembly manufactured was required to be tailored to the particular flexing bar utilized. Further than this, the mechanical combination of elements was found to be unnecessarily complex and not susceptible of the required maximum economy of production.

With a view towards overcoming these disadvantages a primary object of the present invention is to provide a dynamometer which will yield linear readings proportional to the exerted force imposed and be susceptible of a high degree of accuracy.

Another object of the present invention is to provide a dynamometer for measuring exerted forces which is simple and rugged in its construction, and which will accommodate a wide range of loads with a minimum number of adjustments.

Another object of the present invention is to provide a dynamometer for measuring exerted force which may be easily maintained, conveniently used, and readily recalibrated by the user, if necessary, in the field.

Another object of the present invention is to provide a dynamometer for measuring exerted forces which is mechanically constructed so as to impart greater driving torque to the indicating means whereby auxiliary devices may be driven as well as the particular indicating means employed.

A still further object of the present invention is to provide a dynamometer for measuring exerted forces which may be readily adjusted to compensate for manufacturing tolerances.

Still another object of the present invention is to provide a dynamometer which will accommodate substantial overload and which is not damaged or rendered inaccurate by recoil upon release of the force imposed thereon.

These and other objects and advantages of the present invention are generally achieved by providing in a dynamometer for measuring exerted forces the combination of a flexible bar having integral angularly disposed portions, and means for applying force to the angularly disposed portions for effecting flexure of the bar according to the force applied.

As a primary feature of the present invention, cam means are included which are rigidly coupled to a portion of the bar, the cam means having an arcuate surface spaced from the bar.

Support means are coupled to a central portion of the bar. In addition, pivot means are coupled to the support means. The pivot means, in turn, function as a fulcrum to support first lever means extending therefrom in one direction. The first lever means are adjustably dimensioned so as to contact the arcuate surface of the cam means.

Second lever means are supported from the pivot means and structurally related to the first lever means so as to be actuated in response to movement of the first lever means. The second lever means, in turn, are coupled so as to drive responsively to particular indicating means employed.

With the above construction, upon flexure of the bar, the arcuate surface of the cam means is moved relative to the first lever means so as to effect movement of the first lever means with respect to the pivot means, and thereby cause responsive movement of the second lever means coupled to the indicating means utilized. As an important feature of the invention, the arcuate surface in combination with the overall mechanical construction results in an incremental movement of the first lever means and second lever means, which has a linear function according to the load applied. In a preferred embodiment, adjustments are also provided to compensate for manufacturing tolerances in the bar itself as well as to adapt the dynamometer to various load requirements and obtain in every instance a proper zero setting.

A better understanding of the present invention will be had by reference to the drawings, illustrating a preferred embodiment, and in which.

Figure 1:
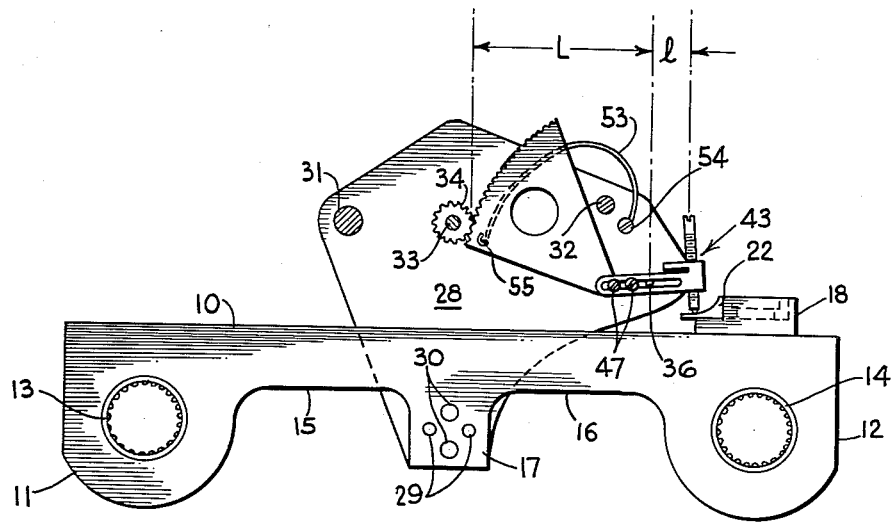
Figure 1 is a front elevation of a dynamometer according to the present invention, one of the supporting plates thereon not being shown for the sake of clarity.
Figure 2:
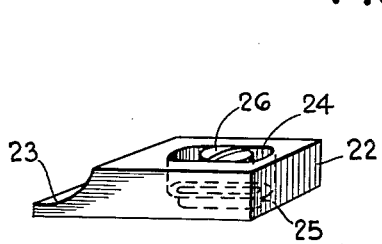
Figure 2 is an enlarged isometric view of the cam means shown in Figure 1.
Figure 6:
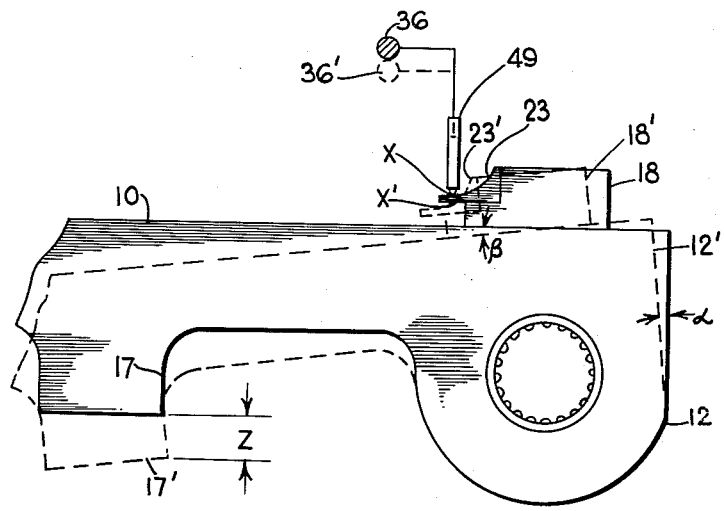
Figure 7:
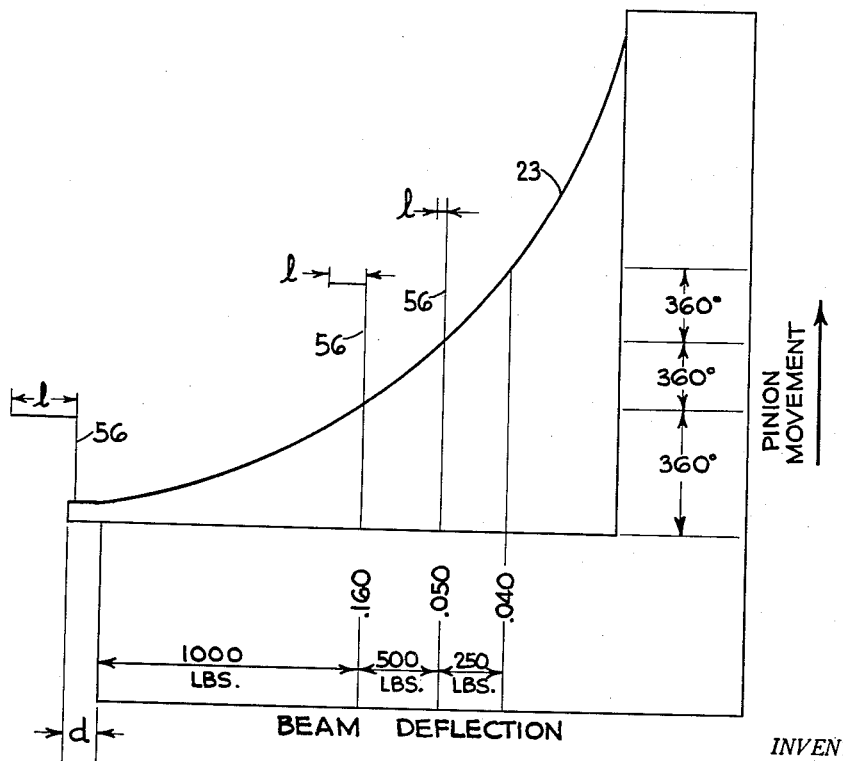

Figure 6 is an enlarged, partially schematic representation of a portion of the dynamometer shown in Figure 1 meant to illustrate the relative movement between the adjustment screw and the cam means upon application of exerted forces; and, Figure 7 is a chart indicating various adjustments and calibrations which may be made to the dynamometer of Figure 1 in order to adapt it to a variety of load requirements.

Referring now to the drawings, there is shown in Figure 1 a dynamometer according to the present invention, which includes a bar 10, similar to bar 11 of Patent Number 2,287,299. The bar 10 is provided at its opposing ends with angularly disposed portions 11 and 12 integrally formed therewith. The angularly disposed portions 11 and 12 include, respectively, openings 13 and 14 for coupling to exerted forces as described in detail in Patent Number 2,287,299. The bar structure, as such, is not deemed to be new or form a part of the present invention except insofar as it functions together with the remainder of the structure in an overall combination.

The bar is provided with intermediate portions 15 (adjacent portion 11) and 16 (adjacent portion 12) and additionally with a downward depending member or lug 17.

Figure 3:
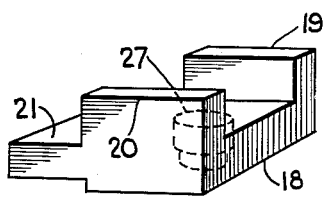
Figure 3 is an enlarged isometric view of the cam support means shown in Figure 1.
Figure 5:
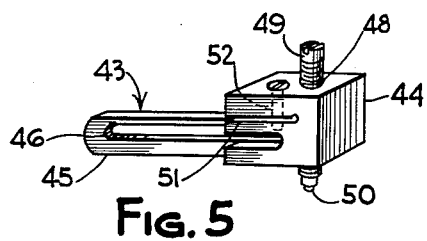
Figure 5 is an enlarged isometric view of the adjustment screw bracket shown in Figure 1.

As shown in Figure 1, there is disposed above the angular portion 12 a cam support 18, which may be rigidly secured, as by pins or screws (not shown) to the upper surface of the bar 10. The cam support is shown more clearly in Figure 3 as including side walls 19 and 20 extending from a flat base portion 21.

The cam support 18 is adapted to receive between its side walls 19 and 20 a cam member 22 provided with an arcuate surface 23. The cam member 22 has vertically extending therethrough an elongated bore 24 having a decreased lateral section 25. The bore 24 is adapted to receive therein a screw member 26, the shank of which extends down through the decreased lateral section 25, and is adapted to be threaded into a hole 27 provided in the base 21 of the cam support 18. With such a construction, it will be appreciated that the cam 22 may be horizontally moved on the surface of the base 21 and secured in various relative positions by merely tightening the screw 26 into the hole 27.

Support means are coupled to the centrally disposed lugs 17 in the form of opposing plates 28. The plates are disposed on either side of the bar 10. Only one plate 28 (on the back side of bar 10 as viewed in Figure 1) is shown for purposes of facilitating the description, although another opposing plate 28 is normally disposed on the front side of the bar. Pins 29 extend through the plates to rigidly couple the plates to the lug 17. Apertures 30 are provided for mounting of an indicating instrument. In addition, plate spacer members 31 and 32 laterally extend between the plates to maintain them in spaced apart and coupled relationship. The oppositely disposed plates further accommodate a shaft 33, which extends laterally between the plates and which has its ends journaled, respectively, in the plates 28. Towards this end, bearings are mounted in the plates to accommodate the ends of the shaft 33. Centrally disposed on the shaft 33 is a pinion member 34 adapted to drive the shaft, the latter in turn being coupled to an indicator pointer or other indicating means or auxiliary indicating means associated with the dynamometer, for example, as disclosed in Patent Number 2,287,299.

Another shaft 36, near the angularly disposed portion 12, as viewed in Figure 1, extends laterally between the plates 28 and is similarly journaled in the plates for rotation.

Figure 4:
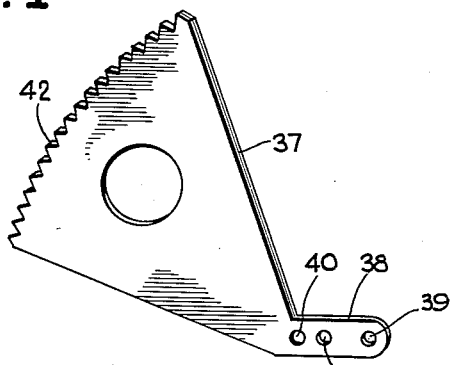
Figure 4 is an isometric view of the sector gear rack shown in Figure 1.

The shaft 36 forms an important part of the improved structure of the dynamometer of the present invention, in that it functions as a fulcrum or pivot means for translating the flexure movement of the bar to an arcuate motion driving the pinion 34 and in turn the indicating means associated with the dynamometer. In this regard, the shaft 36 has coupled thereto a gear sector rack 37, shown more clearly in the view of Figure 4. The gear rack 37 includes a depending arm 38 provided with a bore 39 dimensioned for a force fit on the shaft 36. The rack 37 is additionally provided with threaded holes 40 and 41, for a purpose which will become clear as the specification proceeds. The teeth of the gear sector rack 37 are indicated by the numeral 42 and are designed to engage the teeth of the pinion 34.

Also mounted on the shaft 36 is an adjustment screw bracket 43 which is comprised of an integrally formed block section 44 and a finger 45. The finger 45 has an elongated slot 46 extending throughout most of its length. With such a construction, screws 47 (as shown in Figure 1) extend through the slot 46 to thread into the holes 40 and 41 in the gear sector rack 37. Thus, the adjustment screw bracket 43 is mounted on the shaft 36 in a manner such that the shaft 36 extends through the slot 46 (as shown in Figure 1), and whereby the adjustment screw bracket 43 may be slidably moved radially with respect to the shaft 36 by merely loosening the screws 47, the latter normally having their ends threaded into the holes 40 and 41 of the gear rack 37.

The block section 44 of the adjustment screw bracket 43 has a threaded bore 48 extending therethrough designed to receive the adjustment screw 49. The adjustment screw 49 is provided at its lower end or tip with a ball 50 mounted thereon such that it may roll when the adjustment screw is frictionally engaged with a surface. In order to lock the adjustment screw 49 in any given vertical position with respect to the block 44, a saw slot 51 is provided therein to co-operate with a locking screw 52 adjacent the adjustment screw 49. The saw slot 51 functions as a spring means tending to bind the adjustment screw 49 after it is set in any particular vertical position.

In the position shown in Figure 1, the gear sector rack 37 is disposed at its normal or zero setting. In order to bias the rack toward this position, spring means in the form of a length of music wire 53 has one end secured to plate 28, as by screw 54, and has its other end hooked or coupled to the sector gear rack 37 as at 55. The gear sector rack 37 is limited in its arcuate path of movement by having one of its side edges contact the spacer member 32 in its uppermost position, as shown in Figure 1, and having its lower side edge contact the top surface of the bar 10 when it is in its bottommost position, whereby its movement is limited such that it will always be in engagement with the pinion 34.

The general operation of the improved dynamometer of the present invention will be appreciated by a discussion of the overall construction as viewed in Figure 1. As denoted in Figure 1, the distance from the periphery of the pinion 34 to the center of the shaft 36 may be termed a lever of magnitude L, and the distance from the center of the shaft to the adjustment screw 49 may be termed to have a lever arm $l$. It will thus be appreciated that for any movement of the adjustment screw 49 about the shaft 36 or fulcrum thereof, the teeth 42 of the gear sector rack 37 will move a proportionate distance according to the ratio $L/l$. In addition, because of the small diameter of the pinion 34, a further multiplication will occur with respect to the indicating means or pointer driven by the pinion 34 through the shaft 33. Thus, for an extremely small relative movement of the adjustment screw 49 with respect to the fulcrum or shaft 36, a relatively large angular movement of the shaft 33 is effected to in turn result in a sizable deflection of the pointer driven therefrom. As a consequence, one of the desired objects of the present invention is attained in a combination of simple mechanical elements.

Another important feature of the invention resides in actuation of the adjustment screw 49 in such a manner that its incremental arcuate movement with respect to the shaft 36 is proportional to incremental increases in deflection of the bar 10, whereby linearity is established in the indicating means without any need to design the indicating means on an empirical basis with respect to each dynamometer constructed. The manner in which this linearity is achieved may be best described with reference to Figure 6. For clarity of description, Figure 6 has been drawn schematically. The dotted lines shown in Figure 6 are meant to illustrate, in an exaggerated manner, deflection of the bar 10 and associated parts upon application of exerted forces. As is well known, upon application of exerted forces, the bar 10 will tend to bow downwardly. Towards this end, as pointed out in the above referred to patent, the lug 17 is of relatively small cross section such that it will not significantly affect the bowing action created by the exerted forces on the bar 10. As the bowing action takes place, the angularly disposed portion 12 will tend to rotate about the bottom end section through an angle which may be defined as alpha to assume a position 12'. Similarly, the upper surface of the bar 10 will tend to rotate about the upper corner thereof through an angle which may be defined by the designation (beta). Assuming the end portions of the bar 10 to retain their original shape, the angle (alpha) would equal the angle (beta) whereby the inward and downward movement of the bar would have a proportional relationship. As this movement occurs, the cam support means 18, which is rigidly attached to the top surface of the bar 10, will necessarily effect a responsive movement to assume the dotted line position of 18'. In turn, the arcuate surface 23 of the cam 22 supported in the cam support 18 must move through a distance to a point indicated by 23'.

Since the height of any given point on the arcuate surface 23 with respect to the top surface of the bar 10 will vary according to the distance of the point chosen from, for example, the shaft 36, it is apparent that as the cam surface 23 moves inwardly, it will tend to raise the adjustment screw 49. It is also apparent, however, that the downward movement of the arcuate surface 23 will tend to prevent engagement between the adjustment screw and the surface 23 despite the inward movement heretofore referred to.

However, it is evident that as the bar 10 bows, the central lug 17 will move downwardly a distance equal to $z$ to a position indicated by 17'. As a consequence of this movement, the shaft 36 retaining the adjustment screw 49 will also move downwardly a distance equal to $z$, since the shaft 36 is supported from the plate 28, as shown in Figure 1, which is in turn fastened to the lug 17. Since the lug 17 is disposed at a greater distance from the center of rotation with respect to the angle (beta), than is the arcuate surface 23, it is evident that the downward movement of the adjustment screw as a consequence of its being supported from the shaft 36 will be relatively greater than the downward movement of the cam surface 23. As a consequence, the adjustment screw 49 will be caused to move upwardly on the cam surface 23 from an original point $x$ to the deflected point $x'$ because not only of the inward movement of the cam support 18, but also in view of the relative difference in downward movement of the shaft 36 and the cam surface 23.

It has been found that by properly positioning the adjustment screw 49 at a given zero point on the cam surface 23, a linear movement may be imparted to the adjustment screw 49 in response to varying deflections in the bar 10 as indicated by the angles (alpha) and (beta). It is evident that many variables are present, since the angle (alpha) may not exactly equal the angle (beta) as theoretically assumed. In addition, the particular positioning of the cam support 18 with respect to the end of the bar will necessarily vary the distance through which the arcuate surface 23 moves downwardly, this distance being greater the closer the cam support 18 is to the center of the bar where the maximum bowing occurs.

Nevertheless, experiment has determined that the cam support 18 can be firmly anchored to the bar 10 during manufacture at a distance from the end of the bar 10, proportional with that shown in Figure 1, and thereafter that only two adjustments need to be made to achieve linearity and at the same time properly set the dynamometer to meet given load requirements. These adjustments are most clearly illustrated in connection with Figure 7. In this figure, the vertical line 56 indicates schematically the adjustment screw 49 with the distance "$l$" indicating the lever arm of the adjustment screw with respect to the shaft or fulcrum 36. Thus, for example, where the indicating means employed is to measure loads from zero to one thousand pounds, a maximum lever arm of the adjustment screw is used. This maximum lever arm is achieved in practice by sliding the adjustment screw bracket 43 in a direction away from the center of the bar until the shaft 36 is disposed at the end of the slot 46 within adjacent screws 47. The maximum lever arm is used with respect to the adjustment screw 49, since with loads up to one thousand pounds, relatively large deflections of the bar 10 will occur, whereby less multiplication of movement is required. After the lever arm is established, the cam surface 23 may be horizontally moved by merely moving the cam 22 within the cam support 18 by loosening the screw 26 in the bore 24. With this adjustment, the screw 49 may be set so as to contact the lowermost point of the arcuate surface 23 as indicated.

Where the instrument is to be adapted to smaller load requirements, a shorter leverage arm may be used in order to obtain greater multiplication as indicated for five hundred pounds with a beam deflection of .050 inch. Similarly, with two hundred fifty pounds, a minimum leverage arm may be used with a beam deflection of only .040 inch. It is also evident that different portions of the arcuate surface 23 may be utilized according to the exerted forces applied to the dynamometer.

In the preferred construction of Figure 1, the arcuate surface has a given radius so as to define a circular arc. It is conceivable, however, that other arcuate designs might be employed if found to be empirically satisfactory in the achievement of linear movement.

It is further seen from the view of Figure 7 that the pinion actually rotates three complete revolutions during movement of the adjustment screw up the portion of the arcuate surface 23 as indicated in Figure 7. As a consequence, the adjustment screw may be be set for three different load capacities according to the relative positioning of the adjustment screw with respect to the arcuate surface 23 and the relative length of the lever arm of the adjustment screw with respect to the shaft 36. The chart shown in Figure 7 is merely meant to be illustrative of the results which may be obtained and not indicative of any particular formula used in obtaining them. The actual calibration and adjustments are made empirically by testing the dynamometer after positioning the adjustment screw at various points on the surface 23 and varying the effective lever arm of the adjustment screw with respect to the shaft 36. As a consequence, the theory relied upon is only meant to be a possible explanation for the results achieved without involving the essence of the invention.

In view of the fact that the pinion moves through three complete revolutions from a point of no load to maximum load, it is evident that no damage to the dynamometer would occur upon overload in view of the extensive over travel permitted and in light of the additional fact that the gear sector shaft is stopped in its travel by rigid members 32 and the top surface of the bar 10.

Referring again to Figure 7, it will be noted that the bottom end of the arcuate 23 merges into a horizontal portion denoted by the distance "$d$" which has been found desirable to incorporate with the arcuate surface in order to better obtain a proper zero reading. It is not felt, however, that this feature is necessary to attain a proper linearity.

It is to be further noted from Figure 7 that upon recoil or release of exerted forces, the lug 17' will again assume its solid line position 17 at a rate of speed considerably greater than the motion imparted to the surface 23' to return to its original position 23. As a consequence of this construction, it is apparent that no damage will result to the adjustment screw 49 or other parts of the structure under such conditions.

Although the invention has been described in a preferred embodiment, it will be appreciated that many modifications and changes may be made without departing from the scope thereof, and applicant's inventive features are not to be thought of as limited to those shown except insofar as covered by the following claims.

What is claimed is:

1. A dynamometer comprising, in combination: a flexible bar having integral angularly disposed portions; means for applying force to the angularly disposed portions for effecting flexure of the bar according to the force applied; cam means coupled to a portion of said bar, said cam means having an arcuate surface spaced from said bar and disposed at a predetermined distance from one end of said bar; means for adjusting disposition of said cam means on said bar to vary said predetermined distance; support means rigidly coupled to a central portion of said bar;

pivot means coupled to said support means; first lever means pivoted to said pivot means, said first lever means being dimensioned to contact said arcuate surface; second lever means coupled to and extending from said pivot means, said second lever means being coupled to said first lever means for actuation in response to movement of said first lever means; and, indicating means coupled for actuation responsive to movement of said second lever means.

2. A dynamometer according to claim 1, in which said first lever means comprises: a bracket which may be slidably adjusted with respect to said second lever means to vary the effective lever length of said first lever means relative to said pivot means; an adjustment screw threaded through said bracket, one end of said adjustment screw being adapted to contact said arcuate surface; and, locking means for securing said adjustment screw in a preadjusted threaded position relative to said arcuate surface.

3. A dynamometer comprising, in combination: a flexible bar having integral angularly disposed portions; means for applying force to the angularly disposed portions for effecting flexure of the bar according to the force applied; cam means coupled to a portion of said bar, said cam means having a circular arcuate surface spaced from said bar and disposed at a predetermined distance from one end of said bar; means for adjusting disposition of said cam means on said bar to vary said predetermined distance; opposing plates coupled to and extending from a central portion of said bar; a first shaft extending transversely between and journaled in said opposing plates; first lever means extending from said shaft and dimensioned to contact said arcuate surface; second lever means rigidly coupled to said shaft and coupled to said first lever means, said second lever means including an arcuate gear rack at one end thereof; a second shaft extending transversely between and journaled in said opposing plates; a pinion mounted on said shaft and positioned so as to be in mesh with said gear rack; and, indicating means coupled to said second shaft.

4. A dynamometer according to claim 3, and spring means coupled between one of said opposing plates and said second lever means, said spring means tending to oppose actuation of said second lever means in response to movement of said first lever means.

5. A dynamometer, according to claim 4, and limit means coupled to said opposing plates, said limit means being disposed so as to define the extent of travel of said second lever means in a direction as urged by said spring means.

References Cited in the file of this patent

UNITED STATES PATENTS

| | | |
|---|---|---|
| 304,587 | Ward | Sept. 2, 1884 |
| 342,550 | Ward | May 25, 1886 |
| 1,724,993 | Coker | Aug. 20, 1929 |
| 2,285,500 | Dillon | June 9, 1942 |
| 2,287,299 | Dillon | June 23, 1942 |
| 2,565,970 | Keef et al. | Aug. 28, 1951 |
| 2,694,926 | Hansen et al. | Nov. 23, 1954 |